(12) United States Patent
Siegel et al.

(10) Patent No.: US 7,765,919 B2
(45) Date of Patent: *Aug. 3, 2010

(54) BAKING SHEET WITH SLIDE-OFF RAMP

(75) Inventors: Jeff Siegel, Kings Point, NY (US);
Adam Krent, Brooklyn, NY (US);
David Linn Burnett, Send (GB);
William J. Lazaroff, Floral Park, NY (US)

(73) Assignee: Lifetime Brands, Inc., Garden City, NY (US)

( * ) Notice: Subject to any disclaimer, the term of this patent is extended or adjusted under 35 U.S.C. 154(b) by 1485 days.

This patent is subject to a terminal disclaimer.

(21) Appl. No.: 11/081,432

(22) Filed: Mar. 16, 2005

(65) Prior Publication Data

US 2005/0263013 A1 Dec. 1, 2005

Related U.S. Application Data

(63) Continuation-in-part of application No. 10/995,724, filed on Nov. 22, 2004, now Pat. No. 7,011,014, which is a continuation of application No. 10/389,565, filed on Mar. 17, 2003, now Pat. No. 6,820,541.

(51) Int. Cl.
*A47J 37/10* (2006.01)

(52) U.S. Cl. .................. 99/422; 99/426; 220/573.2; 220/912

(58) Field of Classification Search .................. 99/422, 99/426, DIG. 15, 45, 450; 220/573.2, 912; 269/302.1

See application file for complete search history.

(56) References Cited

U.S. PATENT DOCUMENTS

| | | | | |
|---|---|---|---|---|
| 445,443 A | * | 1/1891 | Everhard | ................. 269/302.1 |
| 491,977 A | * | 2/1893 | Bingham | ................. 269/302.1 |
| 888,960 A | * | 5/1908 | Clark | ........................... 99/422 |
| 1,396,684 A | | 11/1921 | Hansen | |
| 1,766,508 A | | 6/1930 | Graf | |
| 2,057,951 A | * | 10/1936 | Ingram et al. | ................. 99/422 |
| 2,215,611 A | | 9/1940 | Harper | |
| D241,701 S | | 10/1976 | Rader | |
| D243,380 S | * | 2/1977 | Berger | ......................... D7/354 |
| 4,676,151 A | * | 6/1987 | Gorsuch et al. | ............... 99/450 |
| 5,361,687 A | * | 11/1994 | deVries | ....................... 99/426 |
| 5,921,173 A | | 7/1999 | Grycan et al. | |
| 6,287,619 B1 | * | 9/2001 | Khan | ......................... 426/523 |
| 6,820,541 B2 | | 11/2004 | Siegel et al. | |
| 7,011,014 B2 | | 3/2006 | Siegel et al. | |

* cited by examiner

*Primary Examiner*—Reginald L Alexander
(74) *Attorney, Agent, or Firm*—Ryan A. Schnieder, Esq.; Troutman Sanders LLP

(57) ABSTRACT

A substantially flat, heat-resistant baking sheet has a baking surface, a rolled periphery and a baking area within that periphery. The baking area has numerous through-holes. A generally upright wall, integrally formed with the sheet, extends along the first part of the periphery, defining an upper edge. The height of the wall varies from a maximum to a minimum predetermined height, and the wall substantially encloses the baking area along the first part of the periphery. In the example shown, the baking sheet is rectangular: the wall extends along three sides and the fourth side has no wall. A baked product can be slid or pushed off this fourth side without being lifted, the side serving as a slide-off chute or ramp. Condensation between the baking sheet and the baked product evacuates through the holes to allow the surface against the sheet to bake to a crisper consistency.

20 Claims, 4 Drawing Sheets

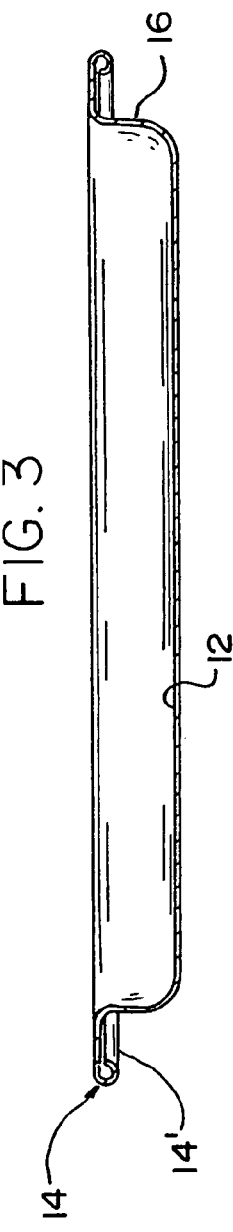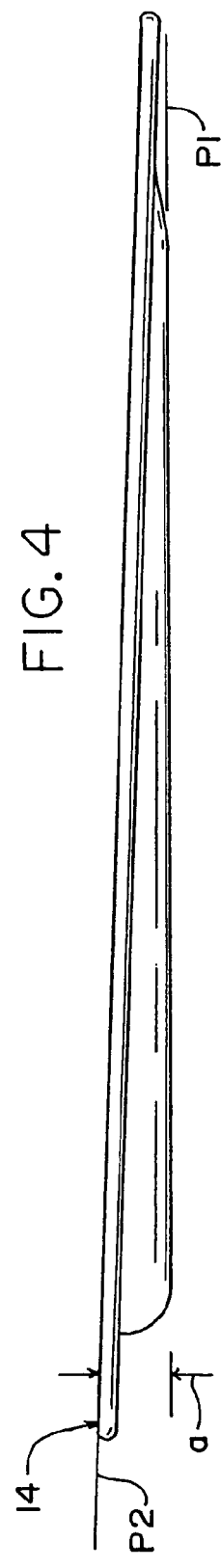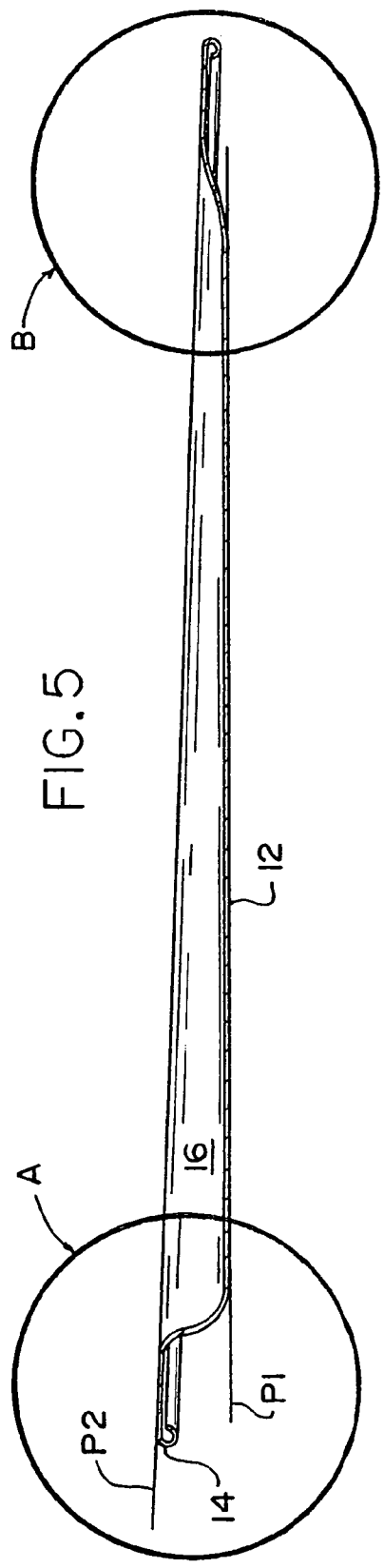

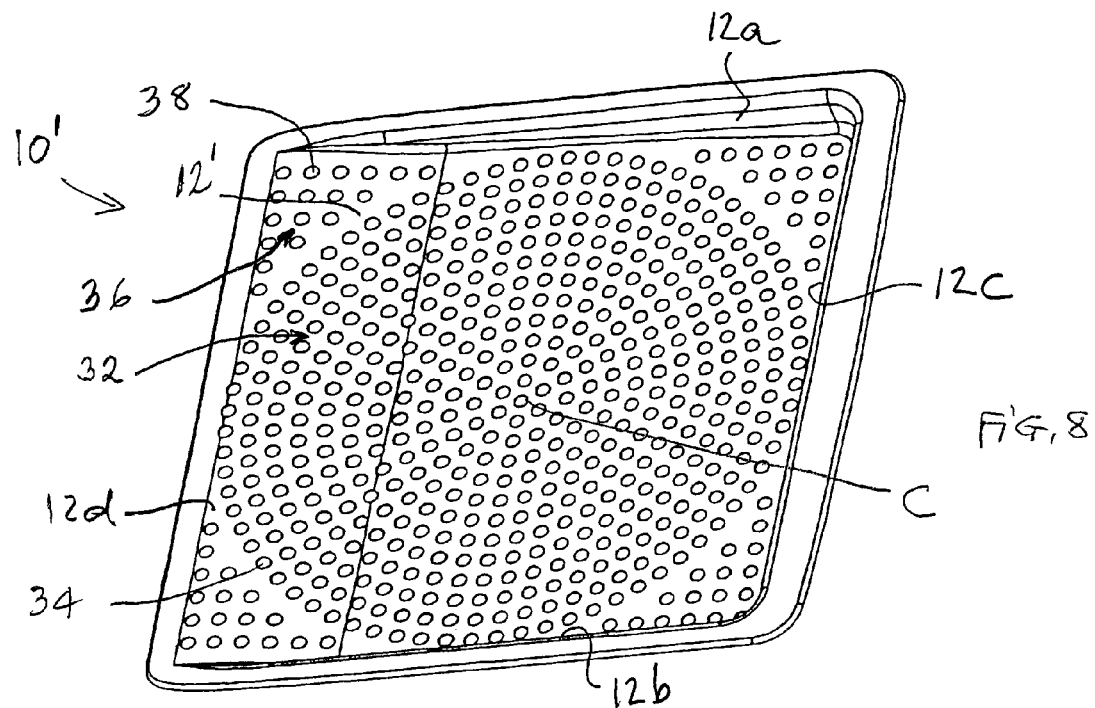
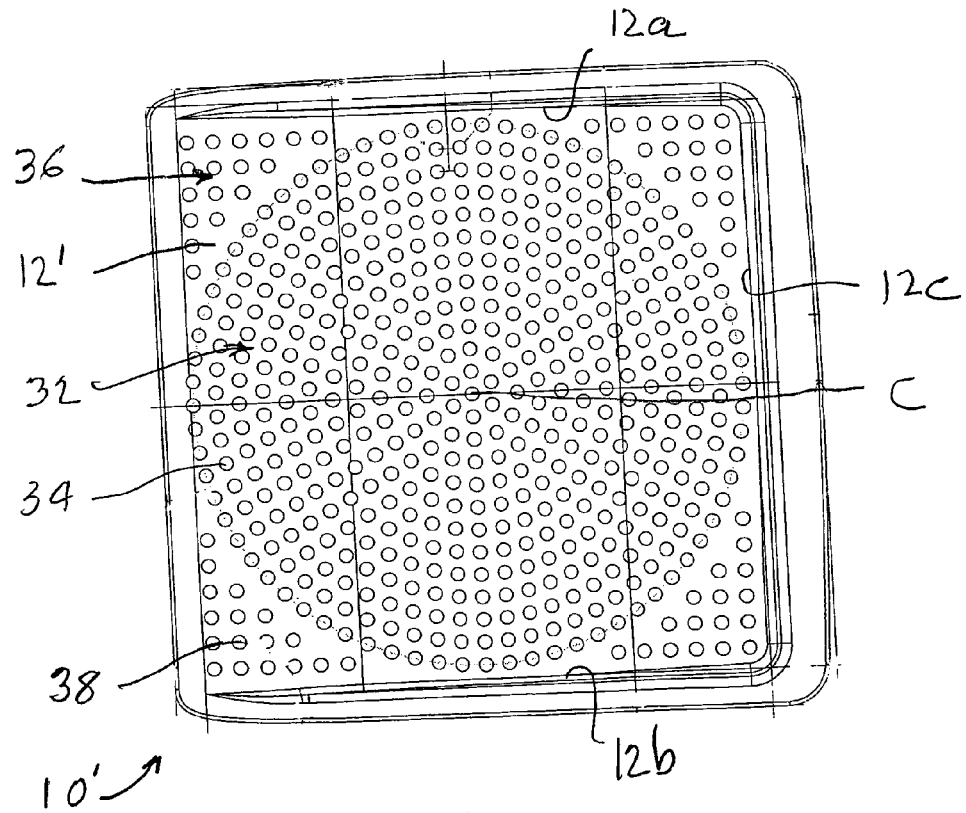

BAKING SHEET WITH SLIDE-OFF RAMP

CROSS-REFERENCE TO PRIOR APPLICATION

This is a continuation-in-part application of patent application Ser. No. 10/995,724 filed Nov. 22, 2004, now U.S. Pat. No. 7,011,014 which is a continuation application based on parent application Ser. No. 10/389,565 filed Mar. 17, 2003, and issued as U.S. Pat. No. 6,820,541 on Nov. 23, 2004.

BACKGROUND OF THE INVENTION

1. Field of the Invention

This invention generally relates to the field of baking accessories, and more particularly to a baking sheet with a slide-off ramp suitable for baking and/or heating certain baked goods such as pizzas.

2. Description of the Prior Art

The most popular type of non-stick pans have a uniform or continuous substantially vertical wall that extends about the entire peripheries of the pans. These are available as a deep loaf, a shallow jellyroll pan (when a shallow sheet has four sides it is called a jellyroll pan) and intermediate round pans. Non-stick is popular because it is low-cost and easy to use and clean. The coating is either silicone-based or PTFE-based, and is applied to carbon steel or aluminized steel. All of these shapes have a rolled edge. A rolled edge can only be applied to metal that lies in the same plane, therefore a plane could be placed along the top of all of the pieces above and it would touch the entire rolled edge. Non-stick bakeware needs less greasing than uncoated bakeware, a selling point to the consumer. The disadvantages of non-stick are that unless it is of the PTFE type, it will degrade in the dishwasher, and all types of non-stick will scar when they are exposed to sharp objects such as a cutting knife.

The rolled edge gives several advantages:
1. A non-stick coating is less likely to chip away because the sides are rounded.
2. The rolled edge is easier to hold and clean.
3. The rolled edge provides a point at which the pan can be hung during the time the non-stick is sprayed on manufacturing.

Other bakeware is known. Professional bakers prefer to cook on raw aluminum pans. The aluminum transfers heat well and is very durable. However, aluminum pans must always be greased well. It is not necessary to roll the edge because these pans are not coated and professionals are not concerned about the raw edge.

Fancy stainless steel bakeware has been sold mainly on the basis of its lustrous appearance. This bakeware will uphold a better finish than raw aluminum, but it does not transfer heat as well (which is important so that one can cook evenly) and it also needs to be well greased.

Tinned steel bakeware is usually the least expensive type of bakeware available, but it is also the least durable.

All of these types of bakeware without non-stick coatings need lengthy cleanups after use.

The standard four-sided, non-stick type of jellyroll pan on the market has four sides. Therefore, to remove the cookies one must lift them off the sheet rather than slide them over the edge. This can break or otherwise damage the cookies while they are still hot and soft.

Also known is a non-stick insulated cookie sheet. The advantage of an insulated sheet is that it heats more gently, and thus the cookies cook before they brown on the bottom. When insulated cookie sheets were first introduced, they tended to be made of aluminum or of tinned steel and so had longer cooking times. Now with dark-colored non-stick insulated sheets, the darker color makes the cooking time closer to normal.

Insulated sheets are typically not dishwasher safe due to the possibility that water may seep in and collect between the sheets. One example of an insulated cookie sheet includes two formed sheets of metal that have been crimped together. Because the edges have a continuous crimp around the perimeter, there can be a folded side only on one or two edges. This is because a fold in sheet metal manufacture can only occur in a straight line.

In some instances an insulated sheet is provided with two folded sides. In this case, there is still a possibility that cookies might slide off the wrong edge. Another insulated cookie sheet, with a fold on two sides, plus a third side with a raw edge has the advantage that here the cookies can be slid off one side only. The drawback, however, is that the third side has sharp edges and may be difficult to clean at the corners. This may be a reason why manufacturers do not use a non-stick coating on this item.

At times it is desired to bake and/or heat certain items that have a pre-baked crust that, unlike fresh dough, does not have a tendency to flow or be viscous. For example, at least partially baked frozen pizzas and/or pies have such a crust. Yet, these items may be frozen and require some baking and heating. However, because they have been frozen ice and/or ice crystals may form on the surfaces of these products that melts when heated. When placed on a solid cookie pan most of the ice formed on the top of the product melts and evaporates. However, the ice on the bottom or condensation that flows to the bottom from ice melting on the product could end up being trapped between the product and the pan. Such condensation, when not fully evaporated, can make the bottom of the product wet and soggy.

SUMMARY OF THE INVENTION

In order to overcome the disadvantages inherent in prior art baking sheets, the present invention comprises a sheet of substantially flat, heat-resistant material forming a baking surface in a first plane. The flat baking sheet surface is provided with a plurality of holes or perforations on its effective baking area. A rolled peripheral edge and a baking area within said peripheral edge is provided. A generally upright wall is integrally formed with said sheet material and extends along only a first portion of said periphery and defines an upper edge contained within a second plane that is inclined relative to said first plane to provide said upright wall with a variable vertical height relative to said first plane from a maximum predetermined height to a minimum predetermined height relative to said first plane. In this manner, said variable height wall substantially encloses said baking area along said first portion of said peripheral edge, and a baked product can only be slid off or pushed off into a receptacle without lifting the product along said second peripheral portion, which serves as a slide off chute or ramp.

This baking sheet allows any condensation that forms on the bottom of the pan to evaporate and escape through the holes or perforations. The item after being baked or heated can be slid or pushed from the flat baking surface, over the edge of the sheet. The edge, being a rolled edge or otherwise that is continuous around the entire sheet, utilizes an integrated, formed exit ramp. This sheet, of one-piece construction, can uniquely have three sides and a fourth side that serves as the exit ramp. Additionally, because the sheet has a rolled edge, it can be coated with a non-stick coating. The coating assists the sliding or pushing of the contents (if the same coating was applied to a sheet without a rolled edge, it may chip or crack at the edges).

BRIEF DESCRIPTION OF THE DRAWINGS

The above and other objects of the invention may be more readily seen when viewed in conjunction with the accompanying drawings, wherein:

FIG. 3 is a cross sectional view of the baking sheet shown in FIG. 2, taken along line 3-3.

FIG. 4 is a side elevational view of the baking sheet shown in FIGS. 1 and 2.

FIG. 5 is a cross sectional view of the baking sheet shown in FIG. 2, taken along line 5-5.

FIG. 8 is a top perspective view of a modified baking pan particularly suited for baking and/or heating certain baked goods such as frozen pizzas and/or pies or other items that may create condensation when heated.

FIG. 9 is a top plan view of the modified baking pan shown in FIG. 8.

DESCRIPTION OF THE PREFERRED EMBODIMENTS

Figure 1:
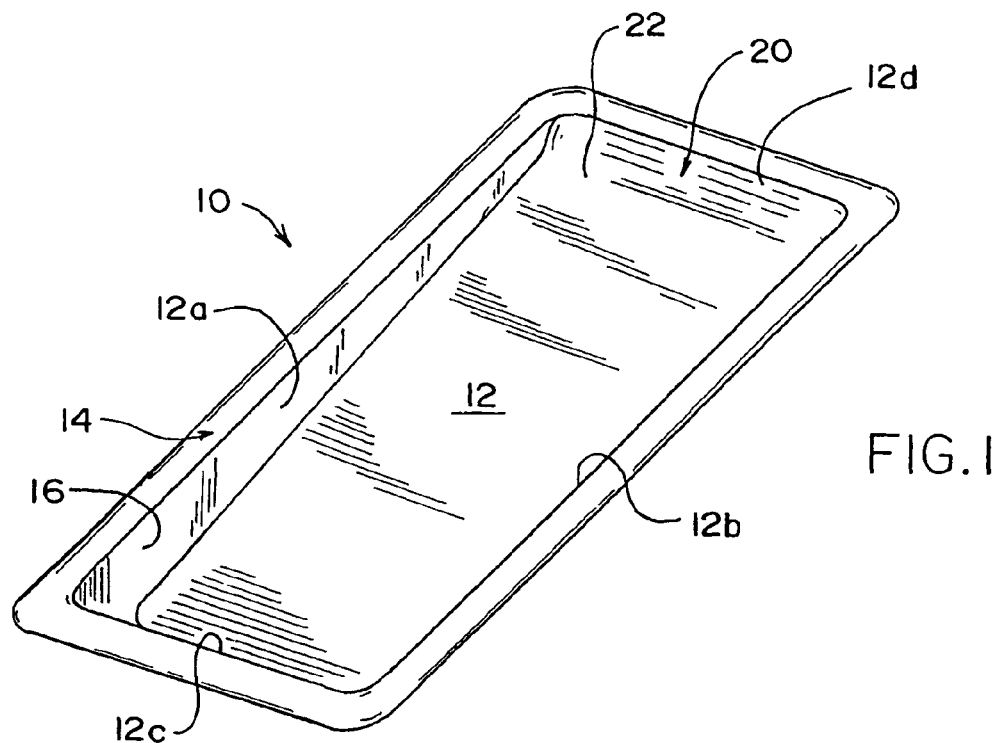
FIG. 1 is a perspective view of a cookie baking sheet with a cookie slide off ramp in accordance with the invention.
Figure 2:
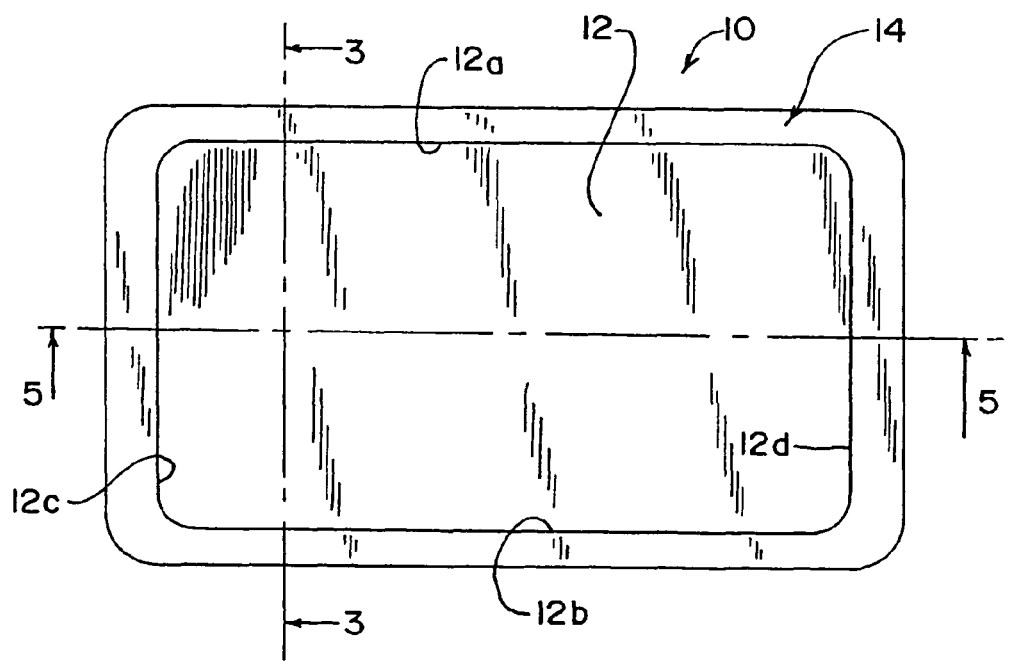
FIG. 2 is a top plan view of the baking sheet shown in FIG. 1.

Turning now to the Figures, in which identical or similar parts are designated by the same reference numerals throughout, and first referring to FIGS. 1 and 2, a cookie baking sheet in accordance with the present invention is generally designated by the reference number 10.

Figure 6:
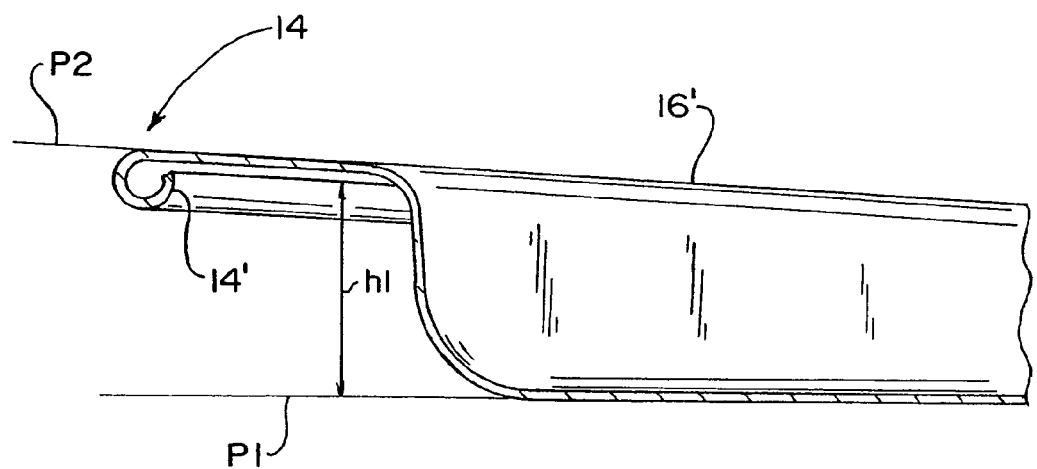
FIG. 6 is a partial enlarged cross sectional view of detail A in FIG. 5.

The baking sheet 10 is formed of a substantially flat heat-resistant material including a baking surface 12 arranged in a first plane P1 (FIGS. 4-6). A generally upright wall 16 is integrally formed with the flat sheet material forming the baking surface 12, and extends along only a first portion of the periphery and defines an upper edge 16' (FIG. 6), contained within a second plane P2 (FIGS. 5-7) that is inclined relative to and the first plane P1. The inclination of the planes is represented by the angle α in FIG. 4. The specific angle of inclination between the planes P1, P2 is not critical and may be relatively small for generally flat items like cookies. In the example illustrated, the angle a is equal to 2.3°. It will be clear from the Figs. that the planes P1, P2 will meet or intersect each other at a point beyond the baking sheet, primarily because of the rolled edge 14'. However, in accordance with the invention, the baking surface 12 is deflected upwardly, slightly away from the plane P1, in order to accommodate the rolled edge 14', forming a ramp or chute 22 that gradually lifts the cookies, baked on the baking surface 12, and allows the cookies to slide up the ramp or chute 22 and off of the edge at 20. The distance d in which the baking surface is deflected upwardly is not critical. However, clearly, the greater the distance d, the more gradual the inclination of the chute or ramp 22, the easier it is to slide the cookies up and off the ramp or chute without damaging them.

Referring in particular to FIG. 1, it will be noted that the upright wall 16 has a variable vertical height relative to the baking surface 12 and first plane P1, from a maximum predetermined height $H_1$ (FIG. 6) to a minimum height $H_2$ relative to the first plane P1. This provides a variable height wall that substantially encloses the baking area or surface 12, and baked cookies can only be slid off or pushed off into a receptacle without lifting the cookies along off the ramp or chute 22.

In the illustrated embodiment, the baking sheet 10 is substantially rectangular and is formed of two opposing longer sides 12a, 12b, and two opposing shorter sides 12c, 12d. A first portion of the periphery includes sides 12a-12c, along which edges there is provided the vertical upright wall 16 of varying height. The second peripheral portion, which is represented by the side 12d, does not have an upright vertical wall but, instead, has a very slight grade ramp or chute 22 that can be used for sliding off the cookies.

An important feature of the invention is that the edge 14 is a rolled edge that extends continuously around the entire periphery of the sheet. By using an integrated, formed exit ramp 22, this sheet, of one piece construction, can exhibit three sides and a rolled edge.

Figure 7:
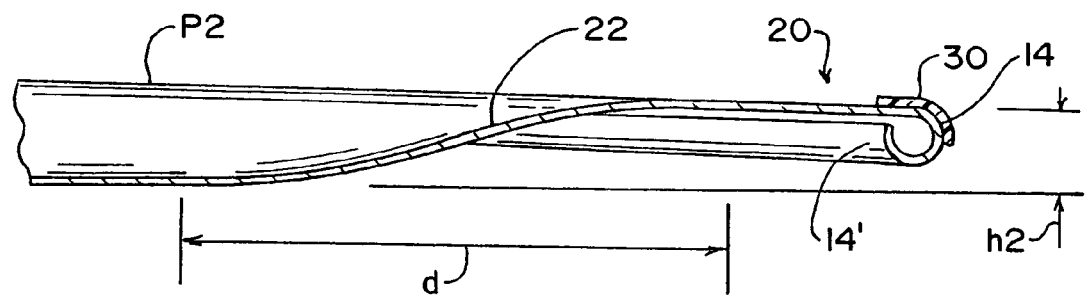
FIG. 7 is a partial enlarged cross sectional view of detail B in FIG. 5.

Because the sheet has a rolled edge, the sheet can be coated with a non-stick coating 30, a small section of which is represented in FIG. 7. The coating assists in the sliding or pushing of the contents, without chipping or cracking the edges of any baked pieces.

It will be evidently from the above that the cookie baking sheet in accordance with the present invention, having three sides and one exit ramp, where cookies can be slid off, facilitates the removal of baked cookies because of the provision of the rolled edge and easy, non-stick coating. The non-stick coating assists in sliding and baking. In this connection, any non-stick coating that is suitable for the purpose may be used. In the presently preferred embodiment, the coating is of the PTFE variety.

Thus, the cookie pan invention has the following advantages over the competition:

1. It has three sides and one exit ramp for sliding off the cookies;

2. It has a rolled edge for comfort and for easier non-stick application; and

3. Its non-stick coating assists in sliding and baking, and is of the PTFE type at the top of the line.

Referring to FIGS. 8 and 9, a modified baking pan 10' is shown that is similar to the cookie baking plan 10 shown in FIGS. 1-7 except that a modified baking surface 12' is formed with a plurality of apertures or holes. Illustrated are a plurality of arrays of holes, including a first array 32 formed of holes 34 arranged in a plurality of circular patterns of concentric circles resulting in holes that can also be viewed as being arranged on a plurality of radial lines emanating from a central point C. In each of the corners of the generally square pan further arrays 36 of holes 38 may be provided if the entire surface 12' is used as an effective baking surface. If only circular goods are to be baked and/or heated, such as pizzas or pies, the arrays 36 may be optional and be omitted. It should be clear, however, that the specific number(s) and pattern(s) of the holes and/or their shape(s) or dimension(s) are not critical as long as a sufficient number of holes are provided to allow for effective escape of condensation from below the surface of the product being baked. Thus, while FIGS. 8 and 9 show the baking surface to be densely populated with holes, this is shown by way of example only. In the embodiment shown, the holes are spaced certain distances from each other in proportion to the magnitude of the dimensions of the holes. The holes are shown to be circular with the spacing between holes approximately equal to the diameters of the holes. As indicated, the embodiment shown in FIGS. 8 and 9 is merely by way of illustration and not limitation, and numerous other arrangements, sizings and spacings of the holes or apertures are possible.

At times it is desired to bake and/or heat certain items that have a pre-baked crust that, unlike fresh dough, does not have a tendency to flow or be viscous. For example, at least partially baked frozen pizzas and/or pies have a such a crust. Yet, these items may be frozen and require some baking and heating. However, because they have been frozen ice and/or ice crystals may form on the surfaces of these products that melt when heated. When placed on a solid cookie pan most of the ice formed on the top of the product melts and evaporates. However, the ice on the bottom or condensation that flows to the bottom from ice melting on the product could end up being trapped between the product and the pan. Such condensation when not fully evaporated can make the bottom of the product wet and soggy. It will be appreciated that the holes 34, 36 assure that condensation does not collect or is trapped under the foods being baked and/or heated, it being readily evaporated and expelled from the below the baked product through the holes.

Therefore, when baking a product from fresh dough, which is soft and viscous, a smooth baking surface needs to be used. For cookies, thus, the embodiment shown in FIGS. 1-7 should be used to avoid the dough from seeping through or permeating the holes. When fully baked and the dough hardened such cookies would be stuck to the baking surface and could not be slid off or released over the chute as intended and described in connection with FIGS. 1-7. However, with at least partially baked or frozen items, such as pizzas or pies, the crust is sufficiently formed and hardened so that it cannot seep through or permeate the holes. The crust stays on the upper surface of the modified flat pan 12. Now the condensation can readily be evaporated and the bottom of the pizza, pie or the like can be baked or heated without any condensation so that the surface in contact with the perforated pan can be baked/heated just like the remainder of the baked product, this promoting firmer and crisper crust.

While this invention has been described in detail with particular reference to preferred embodiments, it will be understood that variations and modifications will be effected within the spirit and scope of the invention as described herein and as defined in the appended claims.

We claim:

1. A baking sheet comprising a sheet of substantially flat heat-resistant material forming a baking surface in a first plane and defining a peripheral edge and a baking area within said peripheral edge, said flat sheet being formed with a plurality of through holes or apertures; a generally upright wall integrally formed with said sheet material and extending along only a first portion of said periphery and defining an upper edge contained within a second plane that is inclined relative to said first plane substantially along a second portion of said periphery thereby providing said upright wall with a variable vertical height relative to said first plane from a maximum predetermined height to a minimum predetermined height relative to said first plane, the baking sheet deflected upwardly from said first plane in proximity to said second peripheral portion in order to accommodate a rolled edge that extends continuously around the entire periphery of the baking sheet, the portion of the sheet deflected upwardly forming a slide-off chute or ramp, wherein the rolled edge that extends continuously around the entire periphery of the baking sheet lies within the second plane, whereby said variable height wall substantially encloses said baking area along said first portion of said peripheral edge, and a baked product can be slid or pushed off into a receptacle without lifting the baked product along said second peripheral portion, whereby condensation that may be formed between said flat sheet and the baked product can be evaporated and evacuated, expelled or removed through said holes or apertures to allow the surface in contact with said flat sheet to bake to a crisper consistency.

2. A baking sheet as defined in claim 1, wherein said sheet and baking surface are substantially rectangular and said first portion of said periphery includes three sides of said rectangular surface and said second portion of said periphery includes the fourth side of said rectangular surface.

3. A baking sheet as defined in claim 2, wherein said sheet and baking surface define two opposing longer sides and two opposing shorting sides, said first portion of said periphery including said two opposing longer sides and one of said opposing shorter sides, and said second portion of said periphery comprises the other of said opposing shorter sides.

4. A baking sheet as defined in claim 3, wherein said baking surface is coated with a non-stick coating.

5. A baking sheet as defined in claim 1, wherein said second portion of said periphery is substantially co-extensive with said first plane of said baking surface.

6. A baking sheet as defined in claim 4, wherein said coating is PTFE.

7. A baking sheet as defined in claim 1, wherein said holes are arranged in at least one array of holes.

8. A baking sheet as defined in claim 7, wherein said holes are arranged in circular arrays.

9. A baking sheet as defined in claim 7, wherein said holes are provided substantially over the entire effective baking surface.

10. A baking sheet as defined in claim 7, wherein said holes densely populate said effective baking surface.

11. A baking sheet as defined in claim 7, wherein said holes are spaced distances from each other that are on the order of magnitude of the dimensions of said holes.

12. A baking device comprising:
a baking sheet of heat-resistant material forming a baking surface in a first plane and defining a peripheral edge and a baking area within the peripheral edge, the baking sheet having a back end, sides, and a front end; and
a generally upright wall extending continuously along the entire peripheral edge and defining a rolled upper edge contained within a second plane thereby providing the upright wall with a variable vertical height relative to the first plane from a maximum height at the back end, to a minimum height at the front end;
wherein the baking sheet in proximity of the front end is deflected upwardly from the first plane in order to accommodate the rolled upper edge, and forming a slide-off chute or ramp; and
whereby the variable height wall substantially encloses the baking area, and a baked product can be slid or pushed off into a receptacle without lifting the baked product at the front end.

13. A baking device as defined in claim 12, the baking sheet having a substantially rectangular shape so that the upright wall provides three sides of the baking sheet, and the front end having a chute in the region of the minimum height of the upright wall, forming a generally smooth and gradual transition between the baking surface in the first plane, and the upright wall in the second plane, for allowing a baked product on the baking surface to be slid off or pushed off the baking surface over the peripheral edge without lifting or damaging the baked product.

14. A baking device as defined in claim 12, the baking sheet being formed with a plurality of through holes or apertures, whereby condensation that may be formed between the baking sheet and the baked product can be evaporated and evacuated, expelled or removed through the holes or apertures to allow the surface in contact with the baking sheet to bake to a crisper consistency.

15. A baking device as defined in claim 12, wherein the baking surface is coated with a non-stick coating.

16. A baking device as defined in claim 12, wherein said coating is PTFE.

17. A baking device as defined in claim 14, wherein the holes are arranged in circular arrays.

18. A baking device as defined in claim 14, wherein the holes densely populate the baking area.

19. A baking device as defined in claim 14, wherein the holes are spaced distances from each other that are on the order of magnitude of the dimensions of the holes.

20. A baking sheet comprising a sheet of substantially flat heat-resistant material forming a baking surface in a first plane, wherein the baking sheet further comprises a portion deflected upwardly from the first plane which serves as a slide-off chute or ramp, and defining a peripheral edge and a baking area within the peripheral edge, the flat sheet being formed with a plurality of through holes, wherein the holes are arranged in at least one array of holes, and wherein the holes are circular and the spacing between the holes is approximately equal to the diameters of the holes; a generally upright wall integrally formed with the sheet material and extending along only a first portion of the periphery and defining an upper edge contained within a second plane that is inclined relative to the first plane substantially along a second portion of the periphery thereby providing the upright wall with a variable vertical height relative to the first plane from a maximum predetermined height to a minimum predetermined height relative to the first plane, whereby the variable height wall substantially encloses the baking area along the first portion of the peripheral edge, and a baked product can be slid or pushed off into a receptacle without lifting the baked product along the second peripheral portion, whereby condensation that may be formed between the flat sheet and the baked product can be evaporated and evacuated, expelled or removed through the holes or apertures to allow the surface in contact with the flat sheet to bake to a crisper consistency.

* * * * *